United States Patent [19]

Howard

[11] 4,397,427
[45] Aug. 9, 1983

[54] DEVICE AND METHOD FOR FEEDING FOOD PROCESSOR

[76] Inventor: Ival Howard, 105 SE. 80th, Portland, Oreg. 97215

[21] Appl. No.: 189,710

[22] Filed: Sep. 22, 1980

[51] Int. Cl.³ .......................................... B02C 18/22
[52] U.S. Cl. .................................... 241/30; 241/92; 241/282.1
[58] Field of Search ...................... 241/92, 37.5, 282.1, 241/27, 30; 81/1 R

[56] References Cited

U.S. PATENT DOCUMENTS

| | | | |
|---|---|---|---|
| 2,590,909 | 4/1952 | Westby et al. | 241/92 X |
| 4,226,374 | 10/1980 | Kafka | 241/92 |
| 4,227,656 | 10/1980 | Engebretsen | 241/280 X |
| 4,250,771 | 2/1981 | Berler | 241/282.1 X |

*Primary Examiner*—Mark Rosenbaum
*Assistant Examiner*—Timothy V. Eley
*Attorney, Agent, or Firm*—Chernoff & Vilhauer

[57] ABSTRACT

A two-piece device for use in holding and guiding items of food, particularly small items, into position for slicing or other processing by the cutting blades of a food processor comprises a holder including an elongate food-holding member for pressing pieces of food against an inner surface of the feed chute of the food processor, and an elongate pusher having a food-engaging end, for controlling and pushing pieces of food along the holder toward the rotary blades of the food processor. A guide plate, to which the food holding element of the holder is connected, orients the food holding element and covers a portion of the feed chute. A gauge plate connected with the pusher prevents insertion of the pusher into the feed-chute beyond a safe depth, and covers the remainder of the opening of the feed chute when fully inserted therein.

13 Claims, 4 Drawing Figures

U.S. Patent  Aug. 9, 1983  4,397,427
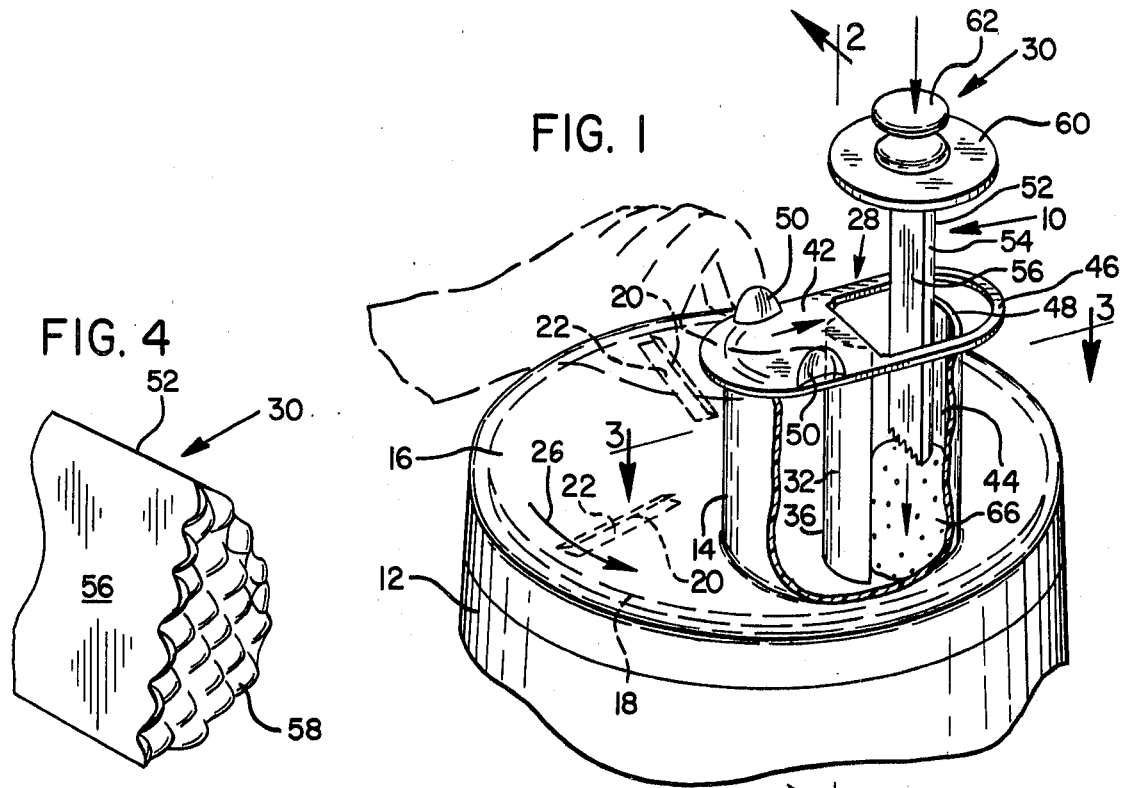
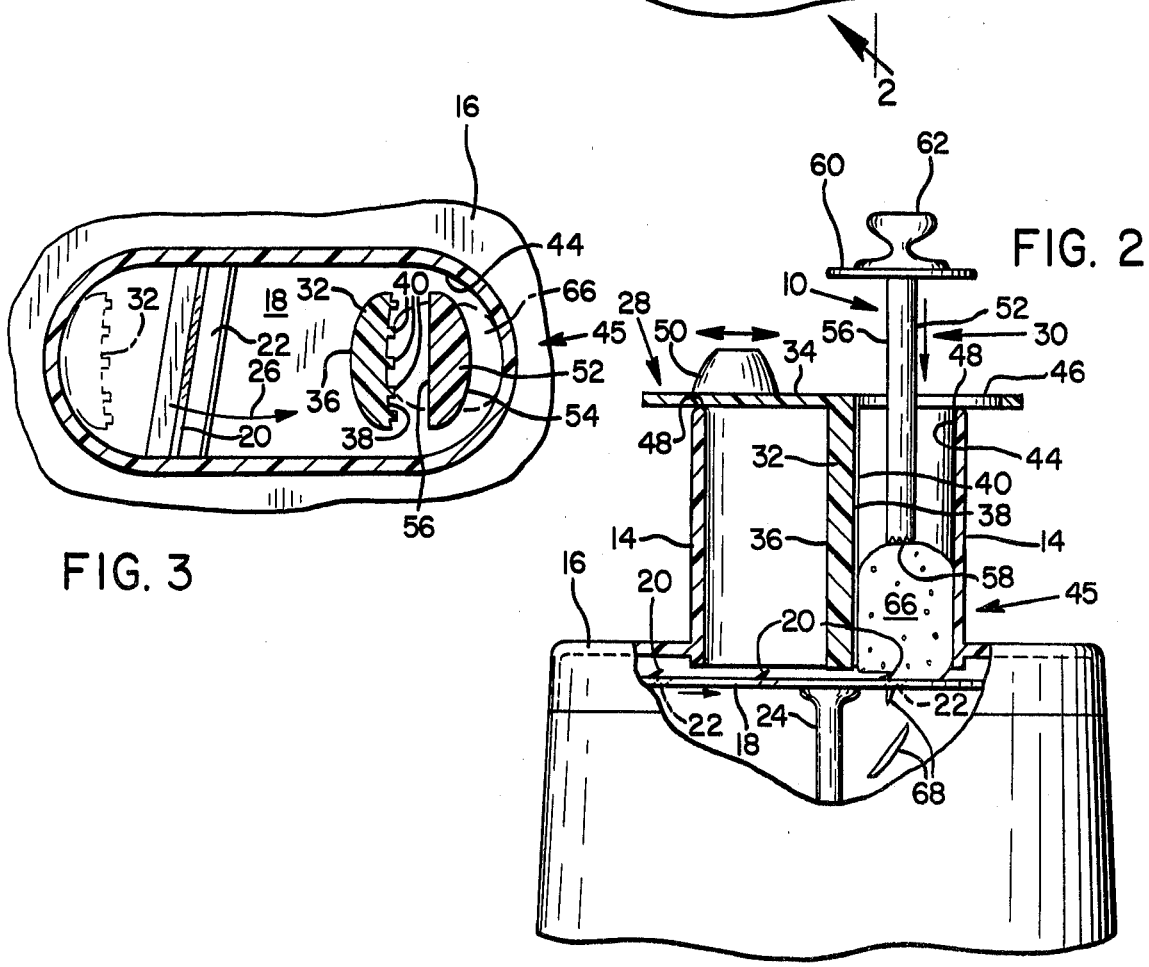

DEVICE AND METHOD FOR FEEDING FOOD PROCESSOR

BACKGROUND OF THE INVENTION

The present invention relates to food processors having rotary blades for rapidly slicing or chopping food items, and particularly relates to a method and device for controllably feeding small food items into such a food processor.

Food processors, because of their ability to rapidly slice, pulp, grind, or chop vegetables, fruits, and meats, have become very popular in recent years. Such food processors usually comprise an electric motor connected to drive various interchangeable rotary blades adapted to either slice, chop, grate, or otherwise cut a large piece of food into smaller pieces. Generally each blade is a flat disc having two or more sharp edges. An opening through the disc is generally provided in front of each sharpened edge of the blade, to permit a slice of the food being processed to fall into a receptacle located below the blade.

Food to be processed is introduced through a generally vertical chute which is normally a part of a cover or shroud which encloses the top side of the rotating blade. The chute is located in eccentric relation to the rotating blade, and a pusher whose size and shape correspond to the interior of the chute is used to push food articles downward into contact with the rotating blade.

So long as the feed chute is filled to capacity with food items to be processed, such food processors can quickly cut food items into attractive slices having parallel sides and regular thickness. Because the feed chute is usually an oval tube about 1½ inches by 3 inches in size, however, processing items such as celery, carrots, cold cuts of meat, and small diameter sausages requires the use of a considerable amount of food to fill the feed chute so that food can be sliced evenly, making use of the processor uneconomical when only small quantities of such items are desired to be sliced.

Another disadvantage of such food processors is that it is very difficult to produce regular slices of unevenly shaped articles of food, particularly articles of small size relative to the inferior dimensions of the feed chute. For example, some foods are easily sliced with such a food processor, but may turn inside the feed chute, resulting in slices which do not have parallel sides. Additionally, stalks of celery, carrot roots, and green onion tops are very difficult to slice evenly using such a food processor.

Slices of small items, such as olives or strawberries, are very attractive as garnishing for salads and the like, and are difficult and time consuming to slice by hand. Slicing such articles by the use of a food processor, however, is also difficult since the article is frequently rotated by the force imparted by the rotating blades of the food processor, with the result that slices are wedge shaped rather than having parallel sides, when the ordinary pusher provided with the processor is used. If food is held by tongs or a fork inside the feed chute, there is a serious danger of the tongs or fork hitting the rapidly spinning blade.

When shredding food, orientation of an oblong piece controls the length of the shreds. Using previously known food processor feeding methods, the pieces of food may be moved by impact of the shredding blade edges, causing uncontrollably irregular shred lengths.

What is desired, then, is a device for feeding articles into a food processor and holding them during processing to permit production of even slices, even when the article being processed is very small in relation to the size of the feed chute of the food processor. Of course, such a device must include provision to prevent its being engaged by the rapidly rotating blades of the food processor, because of the danger involved to the operator, as well as the risk of damage to the food processor.

This problem has apparently not been previously addressed directly, although Campbell U.S. Pat. No. 3,088,345 discloses a kitchen utensil for use in pushing refuse into a rotary garbage disposal unit. The Campbell utensil comprises a flat faced pushing end connected by a shaft to a handle, and includes a cross arm to limit the depth of its insertion into a garbage grinder to prevent interference with the cutting edges of the grinder mechanism.

Azmus U.S. Pat. No. 3,107,711 discloses a similar device for forcing meat into a food grinder, in which the position of the hand relative to the pushing end of the device is adjustable. The handle of the Azmus device also includes a splash guard which extends horizontally around the shaft of the device and limits its insertion into a grinder.

Mueller U.S. Pat. No. 2,066,997 discloses a tamping implement for use in packing vegetables, fruits, and other foodstuffs into containers such as canning jars. One embodiment of the Mueller tamper includes a pliable rubber tip having a V-shaped crotch to aid in gripping the material being packed into a canning jar.

Although the above-described utensils may be useful for forcing material into garbage grinders, meat grinders, and canning jars, none of them is particularly well adapted for use with a food processor to hold small pieces of fruits, vegetables, or meat, to permit the use of a food processor for slicing these food articles into regular flat slices in a safe and efficient manner.

SUMMARY OF THE INVENTION

The shortcomings and drawbacks of the aforementioned previously known devices for forcing articles into garbage grinders, food grinders, canning jars, and the like, which make those devices unsuitable for feeding food into a food processor, are overcome by the present invention, which provides a two-piece device for use in feeding small items into a food processor. The device of the invention comprises a holder which holds pieces of food in place in a tubular feed chute of a food processor and guides them as they are pushed downward by the other piece of the device, a pusher which includes a textured surface on its lower end for engaging the surface of a piece of food and helping to prevent it from turning within the feed chute of the food processor as it is being sliced.

A gauge plate extends horizontally from the upper end of the pusher member to prevent insertion of the pusher too deeply into the feed chute of the processor and to cover the open portion of the feed chute when the pusher is inserted fully therein. A handle is connected to the pusher above the gauge plate.

The holder portion of the food processor feeding device of the present invention comprises a flat guide plate from which a food holding member extends approximately perpendicularly. The food holding member extends from the plate about the same distance as the depth of the feed chute of the food processor, leaving adequate clearance to prevent the food holding member from being struck by the rotary blade of the food processor when the guide plate is in contact with the top of the feed chute. The guide plate, preventing insertion of the food holding member too deeply into the feed chute, also properly orients the food holding member within the feed chute when it rests on the upper edges of the feed chute.

An opening through the guide plate permits the pusher member of the device to be inserted into the feed chute alongside the food engaging, or inner, side of the food holding member. A pair of ear-like grips provided on the top of the guide plate of the holder element of the device are separated from one another and are placed far enough from the food holding member to permit insertion of the pusher element into the feed chute to the full depth established by the gauge plate, even directly alongside the food holding member of the holder.

One side of the food holding member is curved to fit against the interior surface of the feed chute of the processor, while the other side is slightly concave and is provided with parallel ridges or fluting used to engage the surface of pieces of food to prevent the food from twisting within the feed chute, yet allow it to slide downward through the feed chute toward the rotary blade.

The food processor feeding device of the invention thus enables one to evenly slice small items of food, and to slice or shred a long thin item across its length to provide small slices or short shreds.

It is therefore a primary objective of the present invention to provide a device for holding small pieces of food and guiding them into position for slicing in a food processor.

It is another important objective of the present invention to provide a device which permits use of a food processor to process amounts of food too small to be processed otherwise.

It is a further objective of the present invention to provide a device for use with a food processor to enable processing of foods, such as green onion tops, which are very difficult to process otherwise.

It is yet another objective of the present invention to provide a device which securely holds small pieces of food in one orientation during slicing or shredding in a food processor, to produce even, attractive slices or shreds.

It is a primary feature of the present invention that it includes a food holding member having parallel ridges which guide a piece of food as it is fed through the feed chute of a food processor.

It is another important feature of the present invention that the food engaging lower end of the pusher element of the device includes a rough textured surface for engaging a piece of food to control its orientation as it is being processed.

It is another feature of the present invention that the holder and pusher include plates which permit insertion of the food holding member and the pushing member into the feed chute of a food processor to a sufficient depth, yet prevent them from interfering with the blades of the food processor.

It is yet further feature of the invention that the plates included on the holder and pusher cover the opening of the feed chute when fully inserted therein, excluding dust from the interior of the processor while the feeder device of the invention is stored therein.

It is a primary advantage of the present invention that it permits use of a food processor to attractively slice small portions of food which would otherwise have to be prepared by hand.

It is another important advantage of the invention that it enables small pieces of food to be sliced more evenly than with previous methods of using a food processor.

It is another advantage of the present invention that it permits a food processor to be used to slice items of food which would otherwise require hand slicing because of their fragility and shape.

The foregoing and other objectives, features and advantages of the present invention will be more readily understood upon consideration of the following detailed description of the invention taken in conjunction with the accompanying drawings.

BRIEF DESCRIPTION OF THE DRAWINGS

FIG. 1 is a pictorial view of a food processor feeding device embodying the present invention, being used to feed a single small potato into a food processor for slicing.

FIG. 2 is a partially cut away sectional elevational view of the food processor feeding device and food processor shown in FIG. 1.

FIG. 3 is a sectional view of the food processor feeding device and feed chute shown in FIG. 1.

FIG. 4 is a fragmentary pictorial view of the pusher piece of the feeding device shown in FIG. 1.

DETAILED DESCRIPTION OF THE INVENTION

Referring now to the drawings, a food processor feeding device 10 is shown in FIG. 1 in use with a food processor 12 which includes a feed chute 14 extending upwardly above the upper surface of a protective shroud 16 which supports the feed chute 14. Below the protective shroud 16 is a disc-like rotary blade 18 which includes appropriate cutting edges, such as the slicing edges 20 and also having a plane of rotation. A slot 22 in front of each slicing edge 20 permits slices to pass downward through the rotary blade 18 into a receptacle as the shaft 24 (FIG. 2) turns the rotary blade 18 in the direction indicated by the arrow 26.

The feeding device 10 comprises two separate elements, a holder 28 located within the tubular feed chute and movable in a plane parallel to the plane of rotation of the rotary blade and a pusher 30. The holder 28 includes an elongate food holding member 32 which is attached to a guide plate 34. The food holding member 32 has an arcuate outer side 36 and an inner side 38, which may be generally flat, or slightly concave across its width to assist in orienting pieces of food and which includes vertically oriented ridges 40 extending along its full length, to guide food toward the rotary blade 18 and resist any twisting force resulting from cutting edges impacting against the food being processed.

The guide plate 34 is a flat member including a cover portion 42 which is large enough to close the opening in the top of the feed chute 14. The food holding member 32 extends generally perpendicularly from the bottom side of the guide plate 34, so that the inner side 38 is generally parallel with the interior surface 44 of the end 45 of the feed chute toward which the sharp edges of the rotary blade 18 move.

The cover portion 42 extends in the direction of the outer side 36 of the food holding member 32, and a rim 46 extends away from the cover portion 42 in the direction of the inner side 38 of the food holding member 32, defining an opening equal in size to the top opening of the feed chute 14, except for the portion of the feed chute occupied by the food holding member 32 when the food holding member 32 is held with its outer side 36 against the interior surface 44 of the feed chute 14. The cover portion 42 and rim 46 of the guide plate 34 are coplanar and when resting in contact with the upper edge 48 of the feed chute 14 they orient the food holding member 32 in a directly downward extending direction.

A pair of handles 50, which are preferably small, ear-like members, extend upwardly from the cover portion of the guide plate 34. The handles 50 are separated from one another, permitting the user to conveniently and securely grip the holder 28 with a finger on one of the handles 50 and the thumb on the other.

The pusher 30 comprises a shaft 52 which has an arcuate outer side 54 and a flat inner side 56, the cross sectional shape of the shaft 52 thus being approximately similar to the shape of the food holding member 32. A gauge plate 60, which may be circular, extends radially from the upper end of the shaft 52. The gauge plate 60 is large enough to engage the top of the guide plate 34 to prevent the shaft 52 from being extended so far into the feed chute 14 that the rotary blade 18 might strike the pusher. The gauge plate 60 also prevents spattering of juice from the feed chute 14 as the last of the food is processed, and covers the open upper end of the feed chute, when the feeding device 10 is stored therein. A lower end surface 58 of the shaft 52 has a food gripping texture, for example a knurled surface, as may be seen in FIG. 4. This is provided to aid in controlling and manipulating food items to orient them in a desired direction. A handle such as the knob 62 is provided above the gauge plate 60.

Because of the differences in the size of the feed chutes of various food processors, slight variations in the size of the elements of the feeding device 10 will be necessary to allow its use with different models of food processors. In general, however, the length of the food holding member 32 should be approximately the same as the length of the feeding device originally provided with a food processor, in order to provide a safe amount of clearance between the lower end of the food holding member 32 and the rotary blade 18 of the food processor. The length of the shaft 52 of the pusher 30 should be similar, although it may be longer by an amount equal to the thickness of the guide plate 34, to prevent interference with the rotary blade 18.

While other materials may also be found to be usable, the feeding device 10 of the present invention may preferably be manufactured of a plastic material such as an injection moldable transparent plastic which is sufficiently heat tolerant to permit washing in a dishwasher.

The feeding device 10 of the present invention is used by gripping the handles 50 of the holder 28 between the thumb and finger of one hand and inserting the food holding member 32 downward into the feed chute 14 of the food processor. If the processor rotates counterclockwise, the opening defined by the rim 46 should be to the right, and if rotation is clockwise the rim 46 should be to the left, when the feed chute 14 is on the side of the processor nearest to the operator. With the processor power turned off, food to be processed may be placed downward into the feed chute 14 through the opening in the guide plate 34, between the inner side 38 of the food holding member 32 and the inner surface 44 of the feed chute, at the trailing end 45, the end of the oval opening of the feed chute toward which the cutting edges of the rotary blade 18 are directed. A long piece of food may be inserted by hand for slicing across its length, while a fork may be used to place a small item in place. The food holding member 32 is then manipulated with one hand to hold each article of food between the inner side 38 of the food holding member and the inner surface 44 of the feed chute 14, with the guide plate 34 resting on the upper edge 48 of the feed chute 14, and any fork, etc. is removed from the feed chute. If the piece of food is long and tapered, as in the case of a carrot, it may be advantageous to tilt the holder 28 to bring more of the inner side 38 into contact with the food than if the guide plate 34 is in contact with and parallel to the upper edge 48.

With the free hand, the processor motor is turned on, after which the pusher 30 is used by grasping the knob 62 and inserting the shaft 52 downward into the feed chute 14, so that the lower end surface 58 engages the upper surface of the piece of food, for instance a potato 66. With the food processor activated, the pusher 30 is used to urge the food downward to be sliced by the slicing blades 20 or otherwise processed by an appropiate type of blade 18. The food-engaging end surface 58 of the pusher 30, because of its rough texture, cooperates with the ridges 40 to prevent the potato or other food item from rotating as a result of the force imparted by the slicing edges 20 of the rotary blade 18, resulting in production of slices 68 which have parallel sides and are of even thickness.

In addition to permitting even slicing of such easily managed food as potatoes, the feeding device of the invention permits such articles as small bunches of green onion stalks to be chopped. This is best accomplished by bending a small bunch of the onion stalks into a "U" shape and placing the "U"-shaped bunch into the feed chute 14 with the bottom of the "U" uppermost. The ridges 40 help retain the orientation of the onion stalks while the pusher 30 forces the onion stalks downward for slicing by the rotary blade 18.

In a similar fashion such delicate items as strawberries may be sliced, the feeding device 10 of the invention permitting control of individual berries to prevent rotation and produce attractive slices of regular thickness and parallel sides.

For slicing foods of which a large quantity would be necessary to fill the entire feed chute 14, the feeding device 10 of the invention permits small quantities to be properly processed. For instance, single stalks of celery, single carrot roots, small sausages, sticks of cheese, and rolled slices of luncheon meat, ham, and the like may be quickly sliced by the food processor when the device 10 of the present invention is used.

For shredding items into short shreds, the item may be cut into stick-like pieces which are thick enough to permit insertion of the shaft 52 of the pusher 30 between the food holding member 32 and the inner surface 44 of the feed chute 14 while holding the food with the food holding member 32. The food is then pushed along the food holding member 32, guided by the ridges 40, and shreds produced are as long as the thickness of the stick-like piece of food.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A method of feeding food into a food processor having a rotary blade and a tubular feed chute located adjacent one side thereof, comprising:
   (a) inserting an elongate laterally movable food holding member within said feed chute;
   (b) placing food to be processed between said elongate food holding member and an interior surface of said feed chute and holding said food there by urging said food holding member laterally toward said interior surface, in a direction transverse to the length of said feed chute;
   (c) pushing said food through said feed chute along the length of said food holding member, toward said rotary blade, between said food holding member and said interior surface; and
   (d) guiding said food longitudinally along said food holding member and said interior surface of said feed chute while maintaining the orientation of said food during movement along said interior surface by manipulating said elongate movable food holding member.

2. The method of claim 1 including as part of step (c) the step of holding said elongate food holding member oriented generally parallel with said interior surface of said feed chute, with said food held between a side of said food holding member and said interior surface.

3. A device for controllably feeding material into a food processor comprising:
   (a) a tubular feed chute;
   (b) a rotary blade having a plane of rotation;
   (c) a holder located within said tubular feed chute being movable in a plane parallel to said plane of rotation, said holder including elongate food holding member means for holding material to be processed in a desired location within said tubular feed chute of a food processor by urging said material laterally toward an interior surface of said feed chute while permitting said material to slide therealong toward said rotary blade of said food processor;
   (d) guide plate means fixedly connected with said food holding member means and substantially perpendicular thereto, for orienting the length of said food holding member means within said feed chute substantially parallel with the direction of movement of material through said feed chute toward said rotary blade and for limiting the distance to which said food holding member means may be inserted into said feed chute; and
   (e) elongate pusher means for urging said material through said feed chute along said food holding member means toward said rotary blade.

4. The device of claim 3, wherein said pusher means includes an end having food-engaging surface means for engaging the surface of said material to be processed and controlling the orientation thereof while pushing said material toward said rotary blade.

5. The device of claim 4, wherein said food-engaging surface means includes a knurled surface.

6. The device of claim 3, wherein said pusher means includes means for covering at least a portion of said feed chute.

7. The device of claim 3, including gauge means connected with said pusher means for limiting insertion of said pusher means into said feed chute.

8. The device of claim 3, wherein said guide plate means includes a cover portion arranged to close at least a portion of said feed chute when said food holding member means is within said feed chute, without preventing insertion of material to be processed into said feed chute between said food holding member means and said interior surface of said feed chute.

9. The device of claim 3 wherein said food holding member means includes a plurality of parallel ridge means extending along the length thereof for guiding said material through said feed chute along said food holding member means.

10. The device of claim 3, wherein said guide plate means includes means for engaging an upper edge of said feed chute.

11. The device of claim 10 wherein said guide plate means extends radially from said food holding member means to engage an upper edge of said feed chute and limit insertion of said food holding member means within said feed chute, and wherein said guide plate includes rim means defining an opening for permitting insertion of said pusher means therethrough but limiting the extent of insertion of said pusher means into said feed chute.

12. The device of claim 3, wherein said elongate food holding member means and said pusher means each include an arcuately convex outer side whose shape corresponds generally to an arcuate portion of said interior surface of said feed chute, and a generally planar inner side.

13. The device of claim 3, wherein said elongate food holding member means includes an arcuately convex outer side and an inner side including ridge means extending along the length thereof for guiding said material toward said rotary blade, between said elongate food holding member means and said interior surface of said feed chute.

* * * * *